US012352635B2

(12) United States Patent
Betts

(10) Patent No.: US 12,352,635 B2
(45) Date of Patent: Jul. 8, 2025

(54) REMOVABLE PCB TERMINAL BLOCK COLD JUNCTION COMPENSATION

(71) Applicant: EUROTHERM LIMITED, Worthing (GB)

(72) Inventor: Mark Colin Betts, Hove (GB)

(73) Assignee: EUROTHERM LIMITED, Worthing (GB)

( * ) Notice: Subject to any disclaimer, the term of this patent is extended or adjusted under 35 U.S.C. 154(b) by 0 days.

(21) Appl. No.: 18/623,609

(22) Filed: Apr. 1, 2024

(65) Prior Publication Data

US 2024/0247982 A1 Jul. 25, 2024

Related U.S. Application Data

(63) Continuation of application No. 17/382,770, filed on Jul. 22, 2021, now Pat. No. 11,946,815.

(51) Int. Cl.
*G01K 7/13* (2006.01)
*G01K 7/02* (2021.01)
*H01R 12/51* (2011.01)
*H01R 13/66* (2006.01)

(52) U.S. Cl.
CPC ............. *G01K 7/13* (2013.01); *G01K 7/023* (2013.01); *H01R 12/515* (2013.01); *H01R 13/6683* (2013.01)

(58) Field of Classification Search
CPC ........ G01K 7/13; G01K 7/023; H01R 12/515; H01R 13/6683
See application file for complete search history.

(56) References Cited

U.S. PATENT DOCUMENTS

| 4,082,407 A | * | 4/1978 | Smorzaniuk | H01R 12/00 439/59 |
| 5,484,206 A | * | 1/1996 | Houldsworth | G01K 7/13 374/134 |
| 5,741,073 A |  | 4/1998 | Ribeiro et al. | |

FOREIGN PATENT DOCUMENTS

KR 20160061299 A * 5/2016
WO WO-2017191935 A1 * 11/2017 ........... G01D 11/245

OTHER PUBLICATIONS

Office Action issued in corresponding EP Application No. 22 182 786.8, issued Oct. 22, 2024, 6 pages.

* cited by examiner

*Primary Examiner* — Mirellys Jagan
(74) *Attorney, Agent, or Firm* — Burris Law, PLLC

(57) ABSTRACT

An input module includes a terminal block defining a plurality of terminals. Each terminal includes an opening to receive an external wire. The electrical connector assembly is received by at least one terminal and includes an internal thermocouple and a pivot member. The internal thermocouple has a first leg and a second leg coupled together at a first end of the internal thermocouple and spaced apart to define a jaw connector at a second end. The pivot member is pivotable to couple the external wire to the first end. The input module includes a printed circuit board to be coupled to the electrical connector assembly via the jaw connector. The printed circuit board includes a processing circuit to perform cold junction compensation based on a temperature of the printed circuit board and a temperature or a voltage of the internal thermocouple.

20 Claims, 10 Drawing Sheets

REMOVABLE PCB TERMINAL BLOCK COLD JUNCTION COMPENSATION

CROSS-REFERENCE TO RELATED APPLICATIONS

This application is a continuation of U.S. patent application Ser. No. 17/382,770, filed Jul. 22, 2021, now U.S. Pat. No. 11,946,815. The disclosure of the above application is incorporated herein by reference.

FIELD

The present disclosure relates to a field terminating input module for use with an external thermocouple to perform temperature measurements, and more particularly, to a field terminating input module having a terminal block and a removable printed circuit board (PCB) for implementing cold junction compensation when performing temperature measurements.

BACKGROUND

The statements in this section merely provide background information related to the present disclosure and may not constitute prior art.

A thermocouple is a type of sensor which can be used to measure temperature. The thermocouple includes two electrical wires which are made of two different types of conductive metals and joined together to form two junctions. One junction is connected at a location, e.g., an object, where temperature is to be measured (referred to as a "hot junction"). The other junction is connected to a body of known temperature, such as a field terminal, which is at a lower temperature (referred to as a "cold junction"). The temperature difference causes a voltage to develop between the wire pair that is approximately proportional to the difference between the temperatures of the two junctions. The temperature can then be calculated by interpreting the voltage using thermocouple reference tables, or read directly from a calibrated measuring instrument. Since the thermocouple cold end is not at 0° C. or 32° F., cold junction compensation can be performed to compensate for the missing thermoelectric voltage. Such compensation requires measurement of the temperature at the cold junction or cold end, e.g., a temperature at the wire termination of the terminal. However, this measurement may be difficult to achieve accurately (e.g., within 1.5 to 2 degrees of error) because the temperature sensor would need to be closely coupled to the wire termination on the field terminal, which may be subject to size or space constraints.

SUMMARY

This section provides a general summary of the disclosure and is not a comprehensive disclosure of its full scope or all of its features.

In accordance with an example, an input module includes a terminal block and a removable printed circuit board (PCB). The terminal block is configured to receive at least one pair of first and second electrical wires of an external thermocouple. The terminal block includes first and second connector assemblies for electrically coupling the first and second electrical wires of the external thermocouple to a removable printed circuit board. At least one of the first or second connector assemblies includes an internal thermocouple. The internal thermocouple has two conductive legs which are formed of different materials and are separated at an end to form a jaw connector for physically and electrically connecting or disconnecting an edge of the printed circuit board to or from the terminal block respectively. The printed circuit board includes a sensor for measuring a temperature on the printed circuit board, and a processing circuit configured to perform cold junction compensation using a cold junction temperature which is determined based on temperature measurement from the sensor and a temperature or voltage measurement from the internal thermocouple, when measuring a hot junction temperature of the external thermocouple.

Each internal thermocouple can have one leg, from the pair of legs, with a low Seebeck coefficient (uV/C) so that a main external reading is not offset by the terminal contact, and the other leg can be formed of a thermo-sensitive material. For example, one leg can be formed of Phosphor Bronze, which has a low Seebeck coefficient (e.g., less than (<) 1 µV/° C.). The other leg can be formed of Constantan, which has a high or higher Seebeck coefficient (e.g., equal to −35 µV/°C). The leg with the low Seebeck coefficient metal side can be used for the main field measurement, e.g., measurement of the connected wire from the external thermocouple.

In some examples, the processing circuit can be configured to determine a temperature differential between the terminal block and the printed circuit board according to voltage difference between the two legs of the internal thermocouple, and calculate the cold junction temperature based on the temperature measured by the sensor and the determined temperature differential. The processing circuit can be configured to measure a hot junction temperature based on a voltage differential between the first and second conductors of the external thermocouple with cold junction compensation.

In some examples, each of the first and second connector assemblies can include an internal thermocouple having two conductive legs which are formed of different materials and are separated at an end to form a jaw connector for physically and electrically connecting or disconnecting an edge of the removable printed circuit board to or from the terminal block respectively. The processing circuit can determine a temperature differential between the terminal block and the printed circuit board based on a voltage difference between the two legs for each of the internal thermocouples, and calculates the cold junction temperature based on the temperature measured by the sensor and the determined temperature differentials for each of the internal thermocouples. The processing circuit can be configured to calculate the cold junction temperature based on an average of the temperature differentials for each of the internal thermocouples of the first and second connector assemblies. The sensor can be arranged in an isothermal region on the printed circuit board, which is between the jaw connectors of the first and second connector assemblies when connected to the printed circuit board. The terminal block can include a plurality of a set of the first and second connector assemblies for a plurality of external thermocouples.

In some examples, the internal thermocouple can have one of the two legs formed of a metal having a low Seebeck coefficient and the other of the two legs formed of a metal having a high Seebeck coefficient. For example, one of the two legs can be formed of Beryllium-Copper alloy or Phosphor-Bronze alloy, and the other of the two legs can be formed of a Copper-Nickel alloy or Constantan. In some examples, the terminal block can include mechanical fasteners for connecting the first and second wires of the at least one external thermocouple to the first and second connector assemblies respectively.

In a further example, a method is provided of implementing cold junction compensation on an input module including a terminal block and a removable printed circuit board. The terminal block is configured to receive at least one pair of first and second electrical wires of an external thermocouple. The terminal block includes first and second connector assemblies for electrically coupling the first and second electrical wires of the external thermocouple to the printed circuit board. The method involves: measuring a temperature using a sensor on the printed circuit board; measuring temperature or voltage using an internal thermocouple of at least one of the first and second connector assemblies of the terminal block, the internal thermocouple having two conductive legs which are formed of different materials and are separated at an end to form a jaw connector for physically and electrically connecting or disconnecting an edge of the printed circuit board to or from the terminal block respectively; determining a cold junction temperature for the external thermocouple based on the temperature measurement from the sensor and the temperature or voltage measurement from the internal thermocouple; and performing cold junction compensation using the determined cold junction temperature when measuring the hot junction temperature of the external thermocouple. Furthermore, a non-tangible computer readable medium storing computer code, which when executed by a processing circuit, performs the method of implementing cold junction compensation on an input module including a terminal block and a removable printed circuit board.

Further areas of applicability will become apparent from the description provided herein. It should be understood that the description and specific examples are intended for purposes of illustration only and are not intended to limit the scope of the present disclosure.

DRAWINGS

A more detailed description of the disclosure, briefly summarized above, may be had by reference to various examples, some of which are illustrated in the appended drawings. While the appended drawings illustrate select examples of this disclosure, these drawings are not to be considered limiting of its scope, for the disclosure may admit to other equally effective examples. There will now be described various forms thereof, given by way of example, reference being made to the accompanying drawings, in which.

Figure 7:
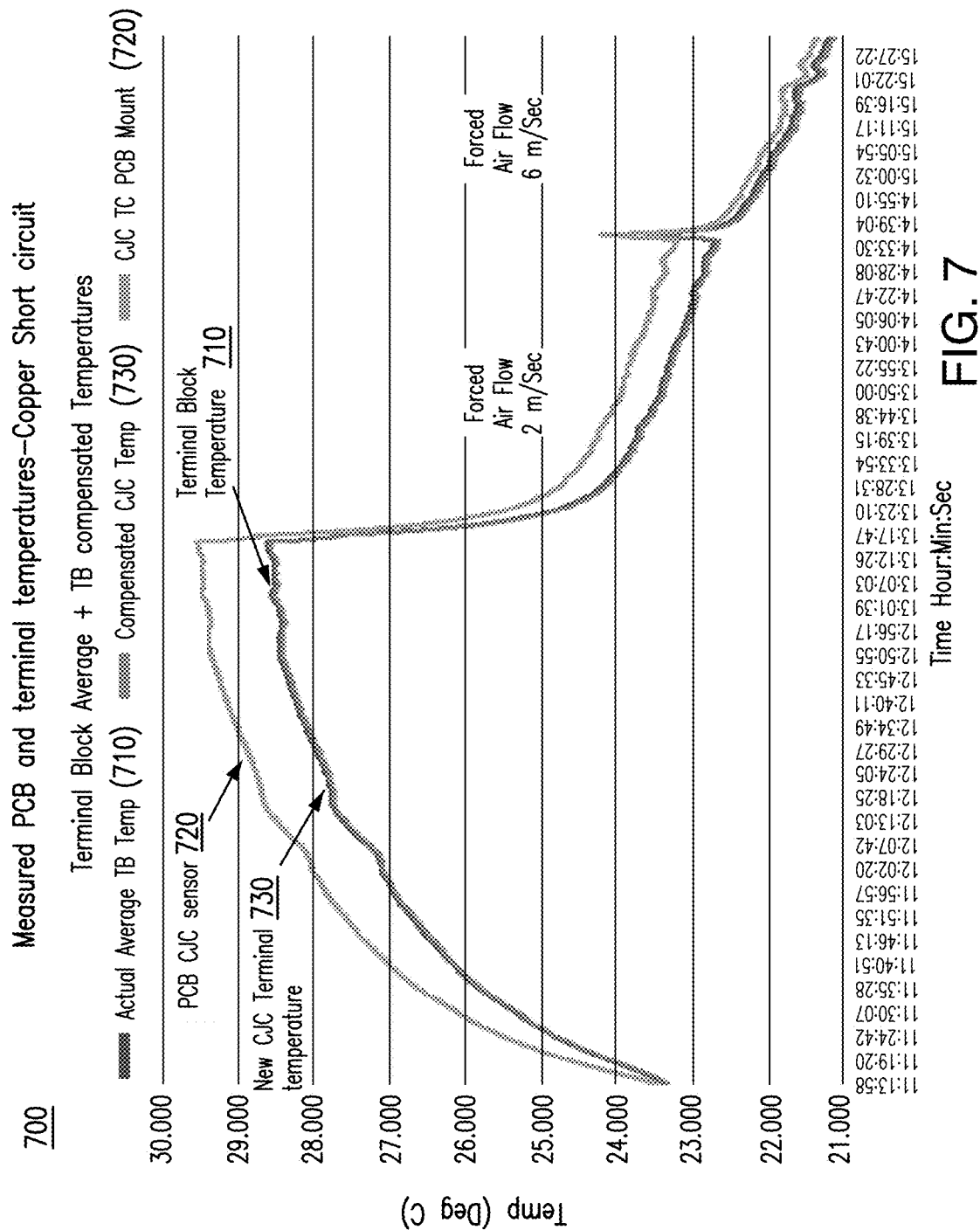
Figure 8:
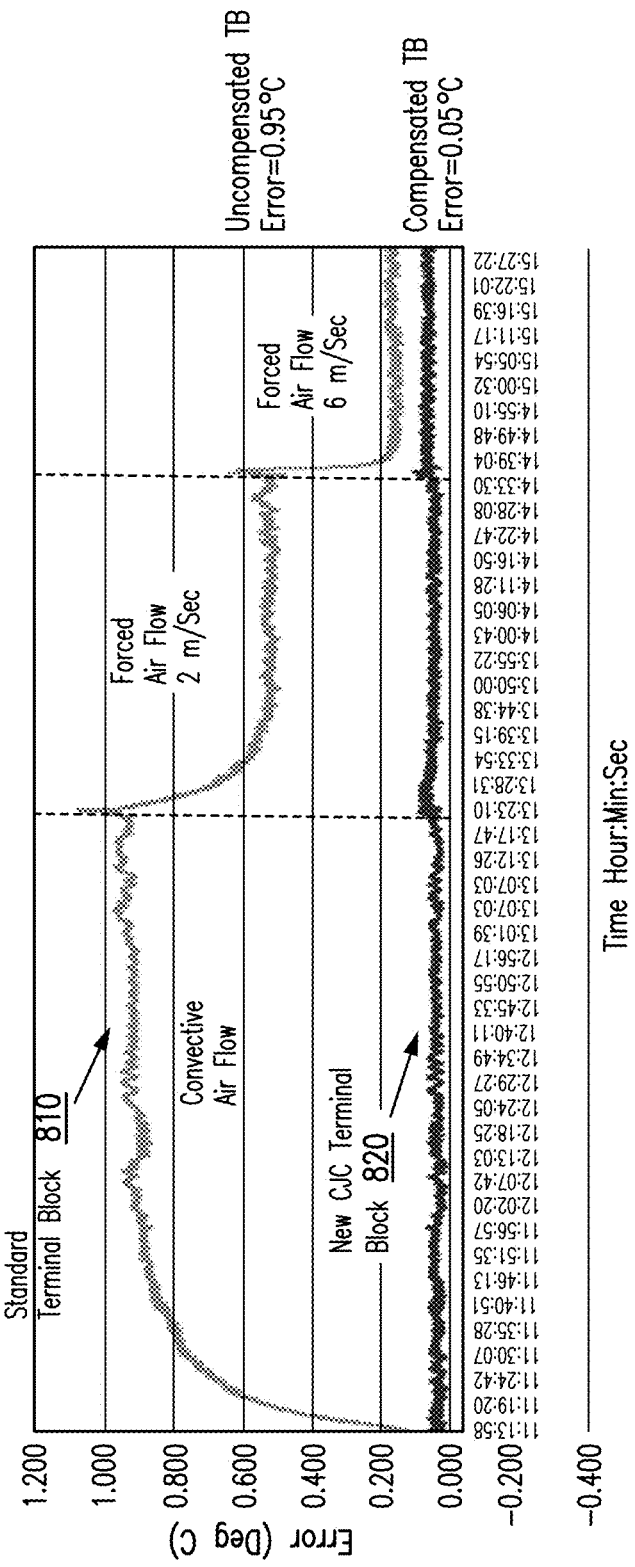
Figure 9:
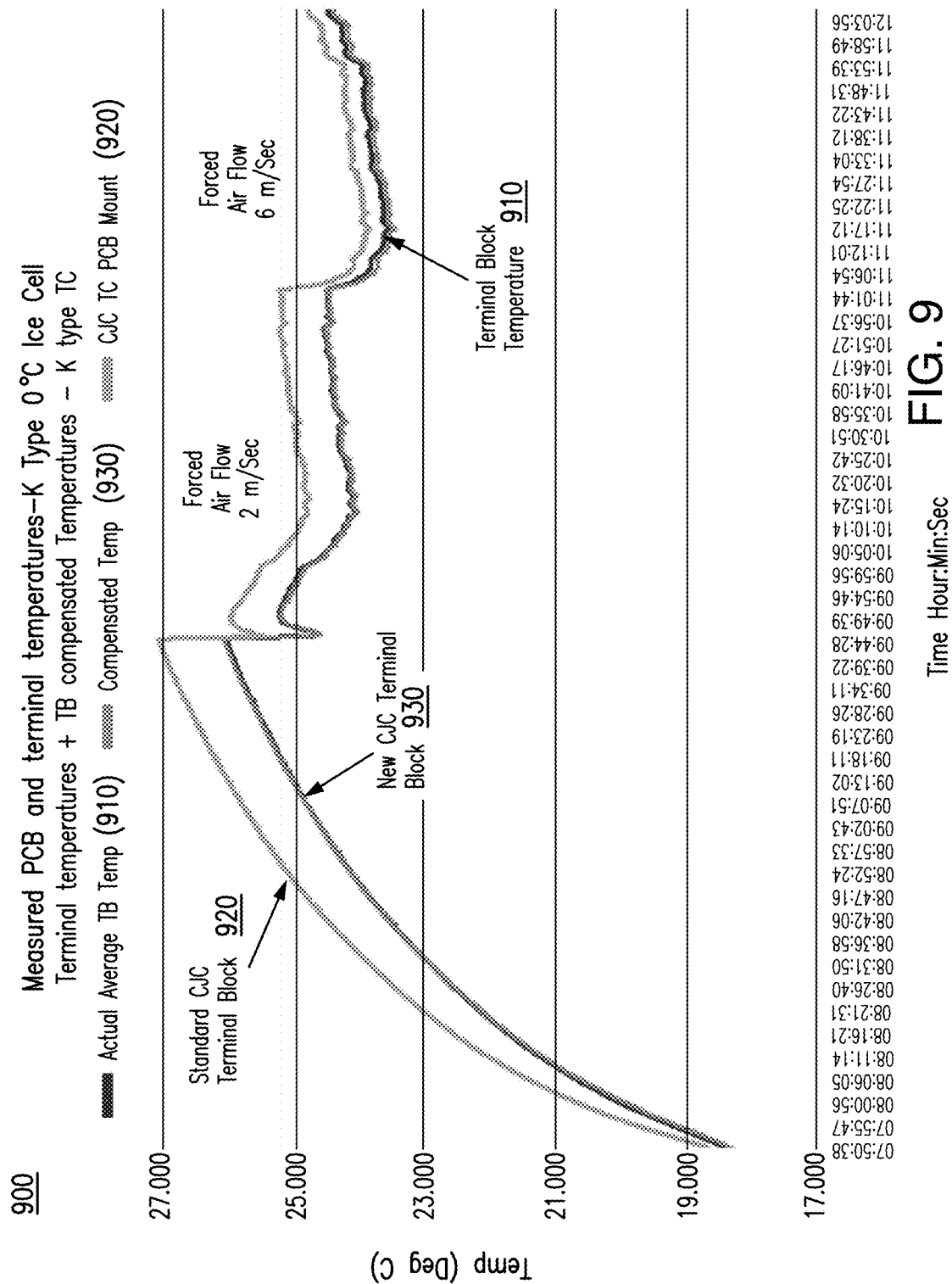
Figure 10:
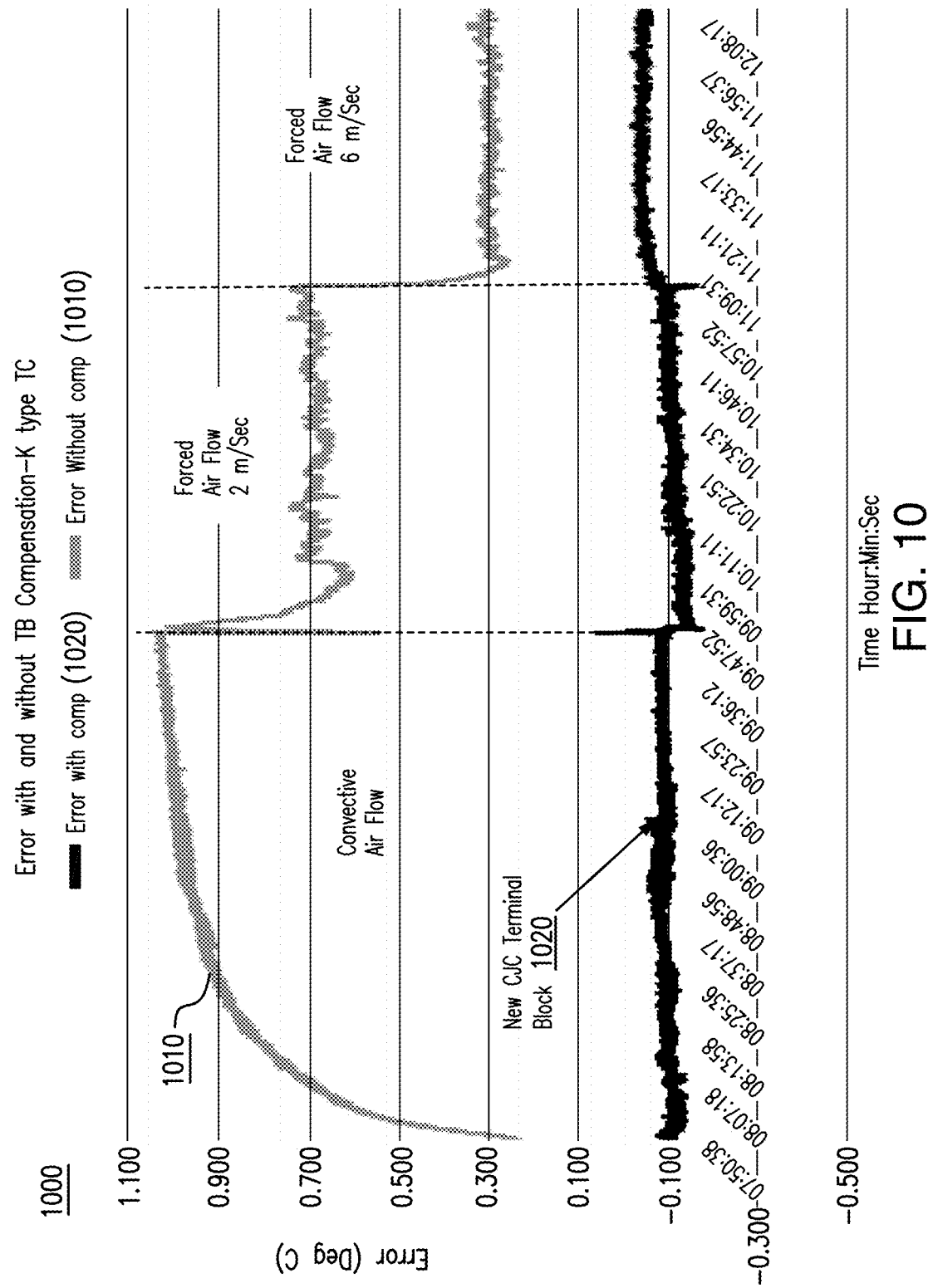

FIG. 7 are example graphs of temperature over time, which show a comparison of an average temperature of a terminal block of an input module, an uncompensated temperature measurement of the terminal block taken using a sensor on a PCB, and a compensated temperature measurement taken using a sensor on a PCB which is compensated using information from an internal thermocouple connector(s) of the terminal block, in accordance with an example;

FIG. 8 illustrates example graphs showing a comparison of temperature measurement error over time for an uncompensated temperature measurement and a compensated temperature measurement using an internal thermocouple connector of the input module, in accordance with an example;

FIG. 9 are example graphs of temperature over time for a K-type input module, which show comparison of an average temperature of a terminal block of an input module, an uncompensated temperature measurement of the terminal block taken using a sensor on a PCB, and a compensated temperature measurement taken using a sensor on a PCB which is compensated using information from an internal thermocouple connector(s) of the terminal block, in accordance with an example; and FIG. 10 illustrates example graphs showing a comparison of temperature measurement error over time for an uncompensated temperature measurement and a compensated temperature measurement using an internal thermocouple connector of the input module, in accordance with an example.

Identical reference numerals have been used, where possible, to designate identical elements that are common to the figures. However, elements disclosed in one example may be beneficially utilized on other examples without specific recitation.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure is directed to a method and system for performing cold junction compensation when measuring a temperature using a thermocouple (also known as a thermocouple sensor). The method and system employs an input module, which is configured to receive, as inputs, a wire pair (e.g., pairs of electrical conductors, wires, lines, wiring, etc.) from at least one external thermocouple in the field 20, and to measure a hot junction temperature of the at least one external thermocouple. The input module can include a terminal block for receiving the wire pair(s) from at least one external thermocouple, and a removable printed circuit board (PCB) which can be physically and electrically connected to and disconnected from the terminal block. The terminal block can include an electrical connector assembly for each wire of the wire pair of the external thermocouple (e.g., a positive terminal and a negative terminal). The electrical connector assembly of the terminal block is configured to electrically couple or decouple a wire from the wire pair to the PCB (and its components). The PCB can include a sensor for measuring a temperature on the PCB (e.g., an isothermal region of the PCB), and processing circuit(s) to perform cold junction compensation, using a cold junction temperature determined based on the measured temperature, in order to measure a hot junction temperature of the external thermocouple. The external thermocouple can be used to measure a temperature of a region or component in a process or system, such as an industrial process or system, in the field 20.

To provide for a more accurate measurement of the cold junction temperature at the wire termination region of the terminal block, the electrical connector assembly, for at least one of the wire pair of the external thermocouple, can include an internal thermocouple (e.g., a thermal sensor) with a hot junction located at or in a wire termination region of the terminal block and a cold junction located in an connection region on the PCB (e.g., an isothermal edge region of the PCB). The internal thermocouple can be used to detect temperature variations (e.g., due to environmental conditions such as air flow, etc.) between the wire termination region on the terminal block and the location of the sensor on the PCB. The temperature measurement from the sensor on the PCB can be adjusted according to the detected temperature variation to determine a cold junction temperature, which more accurately reflects a temperature of the wire termination region on the terminal block. Accordingly, the input module can provide an accurate measurement of the cold junction temperature for use in cold junction compensation when measuring the hot junction temperature of the external thermocouple, which is in the field 20.

The input module of the present disclosure, which incorporates thermal sensor(s) such as the internal thermocouple(s) as part of the electrical connector assembly of the terminal block, can provide various technical benefits or advantages when performing cold conjunction compensation. For example, the input module of the present disclosure can provide: reduced temperature measurement error for a removable card edge field wiring terminal; embedded thermocouple sensor which is also an electrical contact that allows very good thermal contact with the field wiring termination from the external thermocouple; lower susceptibility to thermal errors caused by module power dissipation, which generate additional transient measurement errors; instant accuracy from power ON for thermocouple measurements (e.g., instead of taking over an hour or more); universal thermocouple termination without the use of special metal terminations for different thermocouple connections; simple robust low cost thermal sensor integrated into field terminal block; and cold junction compensation (CJC) measurement errors less influenced by wire diameter, much less sensitive to ambient thermal heat flow through field wiring; simple and low cost configuration using a thermocouple sensor with increased temperature measurement accuracy, the capability to measure and compensate both positive and negative terminals and their termination region independently, and so forth.

In various examples, the internal thermocouple can include two legs, which are electrical conductors formed of different materials and separated from each other on one end to form a jaw connector for physically and electrically connecting to an edge of the PCB. An insulator may also be used to separate a lengthwise portion of the two legs from each other. The insulator may be plastic, such as a plastic sheet or other insulator. In various examples, the internal thermocouple can be a T-type thermocouple (e.g., a positive leg/conductor made of an Copper wire and negative leg/conductor made of Constantan (Cu and Cu—Ni) alloy wire; however, the internal thermocouple can be configured as other types of thermocouples (e.g., K-type, etc.) according to the application (e.g., low temperature application, high temperature application, etc.). In some examples, one leg can be formed of a Copper-Nickel alloy or Constantan, and the other leg can be formed of Beryllium-Copper alloy or Phosphor-Bronze alloy.

It should be understood that the term "internal" thermocouple is simply used herein to refer to a thermocouple of the input module or terminal block so as to differentiate it from an "external" thermocouple which is connectable to the input module (or components thereof), for the purposes of discussion herein.

These and other features of the present disclosure will be described in further detail below with reference to the example figures.

Figure 1:
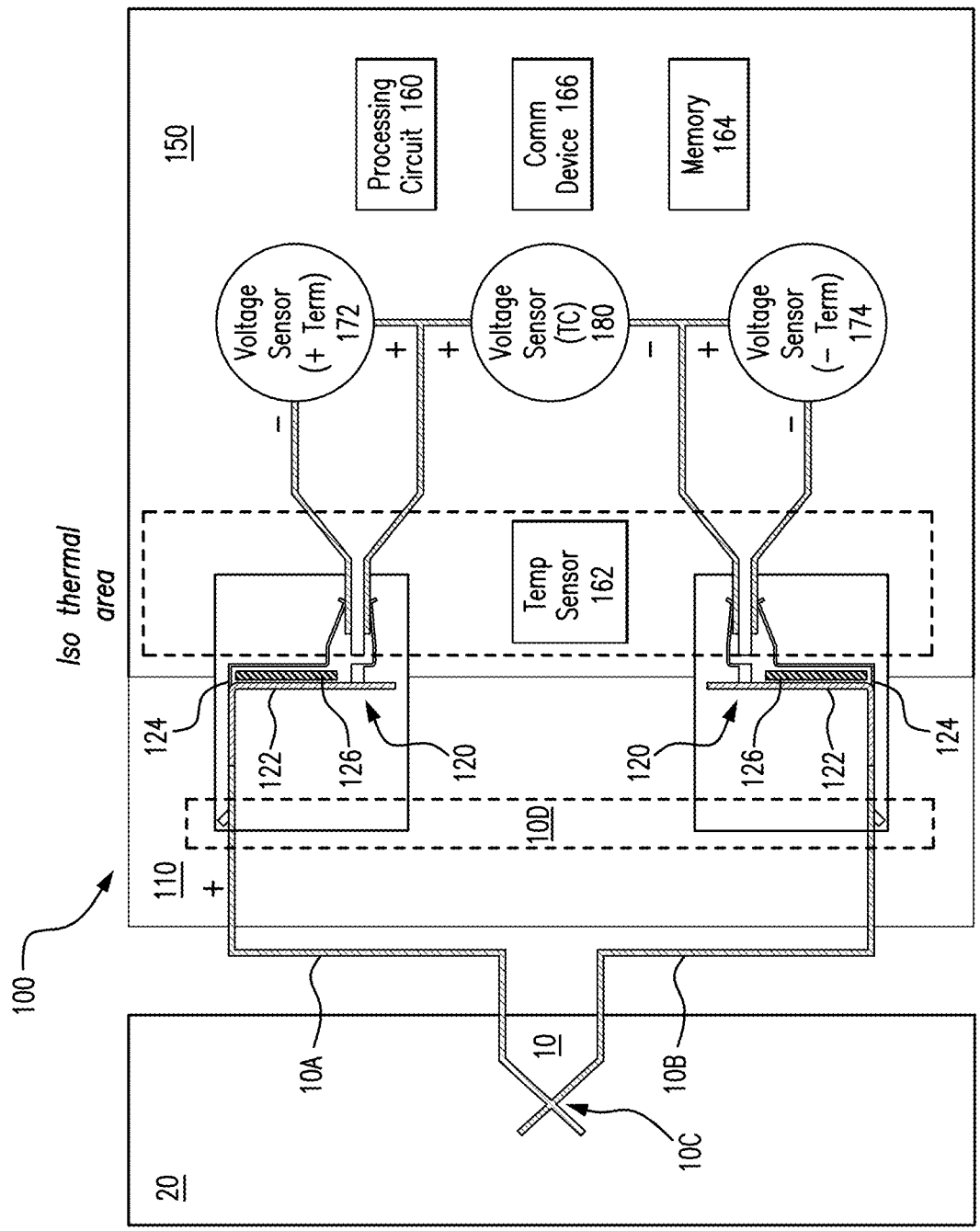
FIG. 1 is a schematic diagram illustrating an example of a temperature measurement system including an input module, with a terminal block and a removable printed circuit board (PCB), for use with one or more external thermocouples to perform temperature measurements using cold junction compensation, in accordance with an example.

FIG. 1 is a schematic diagram illustrating an example of a temperature measurement system including an input module 100 for use with one or more external thermocouples 10 to perform temperature measurements using cold junction compensation, in accordance with an example. For the purposes of explanation, the input module 100 will be described with reference to one external thermocouple 10, which includes two different electrical wires 10A, 10B with a hot junction at 10C and a cold junction at 10D. In this example, the wire 10A is the positive wire, and the wire 10B is the negative wire for the external thermocouple 10.

As shown in FIG. 1, the input module 100 includes a terminal block 110 and a removable printed circuit board (PCB) 150. The terminal block 110 includes an electrical connector assembly for each wire 10A, 10B of the wire pair of the external thermocouple 10. The electrical connector assembly is configured to electrically couple or decouple a wire from the external thermocouple 10 to the PCB 150 (or a corresponding electric contact(s) thereon). In this example, each electric connector assembly includes an internal thermocouple 120 (e.g., a thermal sensor). The internal thermocouple 120 includes two conductive legs 122 and 124 and an insulator 126 which separates the two legs 122 and 124 along a lengthwise portion of one end of the two legs 122 and 124. The legs 122 and 124 of thermocouple 120 are made of different conductive materials and separated to form a jaw connector at an open end for physically and electrically connecting to and disconnecting from an edge of the PCB 150 (and its electrical contacts). The internal thermocouple 120 has a hot junction located in, at or around the wire termination region of the terminal block 110, and a cold junction located in, at or around the edge region of the PCB 150 at which the jaw connectors of the electrical assemblies connect to the PCB 150. The two legs 122 and 124 can be formed of a different metal or metal alloy. In this example, the internal thermocouple 120 may be a T-type thermocouple in which the positive leg 122 is made of copper and the negative leg is made of Constantin.

As further shown in FIG. 1, the PCB 150 includes a processing circuit 160 and a sensor (or sensor circuitry) 162. The sensor 162 can be a temperature sensor or other sensor(s) for measuring (e.g., sensing, detecting, measuring, calculating, deriving, determining, etc.) a temperature at a desired region (e.g., area, location, region, etc.) on an integrated chip (IC) on the PCB 150, such as for example at an edge region of the PCB 150 at or proximate to a location where one or both of the jaw connectors of the electrical connector assemblies connect to the PCB 150. In this example, the sensor 162 is located between the jaw connectors of the connector assemblies of the terminal block 110 associated with the wires 10A, 10B for the external thermocouple 10. The PCB 150 can include other sensors (or sensing circuitry), such as sensors 172 and 174 for measuring a voltage difference between the legs 122 and 124 of the internal thermocouple 120 on the positive terminal and the negative terminal, respectively, and sensor 180 for measuring a voltage difference between the wires 10A and 10B of the external thermocouple 10. The sensors 172, 174 and 180 can be voltage sensor or other sensor from which voltage can be measured (e.g., sensed, detected, measured, calculated, derived, determined, etc.). When measuring the voltage difference between the positive and negative terminals of the external thermocouple 10, one of the two legs 122 and 124 of the internal thermocouple 120 for each of the positive and negative terminals can be used (e.g., the leg for the positive terminal or made of Copper).

One or more of the sensors (e.g., 162, 172, 174, 180, etc.) on the PCB 150 can be incorporated into the processing circuit 160 or provided as a circuit element separate from the processing circuit 160 on the PCB 150. The PCB 150 also can include a bus system for enabling communication between different components of the PCB 150, and conditioning circuitry including, for example, filters and Analog-to-Digital converters (ADCs), and so forth, for conditioning electrical signals received at the PCB 150 for processing.

The processing circuit 160 can be configured to perform various operations for the methods and processes described herein related to determining a temperature at a hot junction of the external thermocouple 10. These various operations and methods can include: sensing, detecting, measuring, calculating, deriving or determining a temperature on the PCB 150 (or region thereof) using information from the sensor 162; sensing, detecting, measuring, calculating, deriving or determining a differential voltage between different wires of the external thermocouple 10 using the sensor(s) 180, and between different legs of each internal thermocouple 120 using corresponding sensor 172, 174; sensing, detecting, measuring, calculating, deriving or determining differential temperature between the wire termination region of the terminal block 110 and the edge region of the PCB 150 according to the differential voltage of the internal thermocouple 120; determining a cold junction temperature (and updates thereof) based on the determined temperature of the PCB 150 (or region thereof) and the temperature measurement (e.g., differential temperature) from the internal thermocouple 120; performing cold junction compensation according to the determined cold junction temperature; sensing, detecting, measuring, calculating, deriving or determining temperature of the hot junction of the external thermocouple 10 based on the differential voltage between the wires 10A, 10B of the external thermocouple 10 using cold junction compensation; communicating with other devices or systems; and other operations described herein.

The processing circuit 160 can be, for example, a processing circuit(s), a processor(s) or controller(s) such as a microcontroller, a microprocessor, an application specific integrated circuit (ASIC) device, field programmable gate array (FPGA), programmable logic controller (PLC) or other processing system or the like or a combination thereof. In FIG. 1, the processing circuit 160 can be communicatively coupled to a memory 164, which is for example incorporated into the processing circuit 160 or arranged at another location on the PCB 150. The processing circuit 160 can communicate with other devices and systems (e.g., PLC) via the communication device (or interface) 166.

The memory 164 can store any data required by the processing circuit 160 to perform the operations of the methods and processes described herein, including for example sensing, detecting, measuring, calculating, deriving or determining temperature on the PCB 150, differential voltage between different wires or conductors of a thermocouple (e.g., 10, 120), differential temperature between the hot junction and the cold junction of a thermocouple (e.g., 10, 120), cold junction temperature (and updates thereof), hot junction temperature of external thermocouple (e.g., 10), or executing any other functionality including those described herein. For example, the memory 164 can store data such as parameters (e.g., Seebeck/thermocouple coefficient(s), Seaback/thermocouple coefficient equations, formulas or functions, or Seebeck coefficient/thermocouple reference tables for the thermocouple materials, or thermocouple type or related data) and other parameters for use in sensing, detecting, measuring, calculating, deriving or determining a temperature at a hot junction for a thermocouple, a temperature differential between hot and cold junctions of a thermocouple, a cold junction temperature to perform cold junction compensation, and other parameters or data. This data can be stored in the memory 164 at the factory, manually entered via an input/output device (not shown), or remotely downloaded via the input/output device. The memory 164 can be integrated with the processing circuit 160, or the memory 164 can be external and remotely coupled to the processing circuit 160 on the PCB 150. The memory 164 can be, for example, random access memory (RAM), read only memory (ROM), electronic erasable programmable read only memory (EEPROM), flash memory, or other volatile or non-volatile memory (i.e., non-transitory computer readable media).

In various examples, the cold junction temperature (also referred to as the cold junction compensation (CJC) temperature) can be determined by adjusting the temperature measured by the sensor on the PCB 150 using an average of the detected temperature differential from the two internal thermocouples 120 associated with the two different field terminals (e.g., positive and negative terminals) of the input module 100. For example, the following equation can be used to determine the cold junction temperature:

$$\text{Temp (CJC)} = \text{Temp (Sensor)} + ((\text{Temp }(mv+) + \text{Temp }(mv-))/2)$$

where:
Temp (CJC) is the cold junction temperature,
Temp (Sensor) is the temperature from the sensor on the PCB,
Temp (mv+) is the temperature differential between the terminal block and the PCB for the positive terminal, and
Temp (mv−) is the temperature differential between the terminal block and the PCB for the negative terminal.

For example, if the temperature measured by the sensor is 25° C., the temperature differential on the positive terminal is −1.2° C. and the temperature differential on the negative terminal is −1.0° C., then the cold junction temperature is 23.9° C. The temperature differential can be determined according to the Seebeck/Thermocouple coefficients for the materials/type of the internal thermocouple 120 at the measured temperature. For example, the Seebeck coefficient for Phosphor Bronze+Constantan thermocouple may be 38.3 mV/° C. at 25° C., the Seebeck coefficient for Cooper+Constantan thermocouple (T-type thermocouple) may be 40.0 mV/° C. at 25° C., and so forth.

Alternatively, the cold junction temperature for the external thermocouple 10 can also be determined by calculating or deriving the hot junction temperature of the internal thermocouple 120 based on the temperature measured by the sensor 162 (e.g., cold junction temperature for the internal thermocouple) and the voltage differential between the different legs of at least one of the internal thermocouple 120. In some examples, when an internal thermocouple is available for each of the positive and negative terminals, the average of the voltage differential between the different conductors of each of the two internal thermocouples 120 may be used. As a further example, the cold junction temperature can be determined using the internal thermocouple 120 for the positive terminal and for the negative terminal, and an average of the two determined cold junction temperatures can be used as the final cold junction temperature.

In an example operation, on the input module 100, the temperature on an isothermal region of the PCB 150 is measured by the sensor 162, and any temperature variation between a wire termination region on the terminal block 110 and the isothermal region of the PCB 150 is detected by evaluating voltage difference between the legs of the internal thermocouple(s). The temperature measurement of the isothermal region on the PCB 150 is adjusted according to the detected temperature differential to determine a cold junction temperature (e.g., temperature at the wire termination region of the terminal block 110) for the external thermocouple 10. In this way, it is possible to obtain an accurate measurement of the cold junction temperature using temperature measurement taken on the PCB. Once the cold junction temperature is determined, cold junction compensation can be performed when measuring the hot junction temperature for the external thermocouple 10. For example, the appropriate Seebeck coefficient for the materials of the external thermocouple 10 at the determined cold junction temperature can be obtained from a thermocouple reference table or other data format stored in memory, and the hot junction temperature can be calculated using the cold junction temperature, the Seebeck coefficient and the voltage difference between the wire pair of the external thermocouple 10. Alternatively, the Seebeck effect at varying temperatures for the materials of the external thermocouple 10 can be expressed as a function (e.g., a polynomial or other equation(s)), which can be used to calculate the hot junction temperature of the external thermocouple 10 according to the cold junction temperature and the voltage differential between the wire pair of the thermocouple. These and other variations for calculating a hot junction temperature for a thermocouple, with cold junction compensation, would be understood by one of ordinary skill in the art in light of the present disclosure.

While the above describes an example in the context of one external thermocouple 10, it should be understood that the input module 100 (and its components) can be configured to provide a plurality of terminals (e.g., a plurality of terminal positive and negative pairs) and perform temperature measurements for a plurality of external thermocouples 10 in the field 20.

Figure 2:
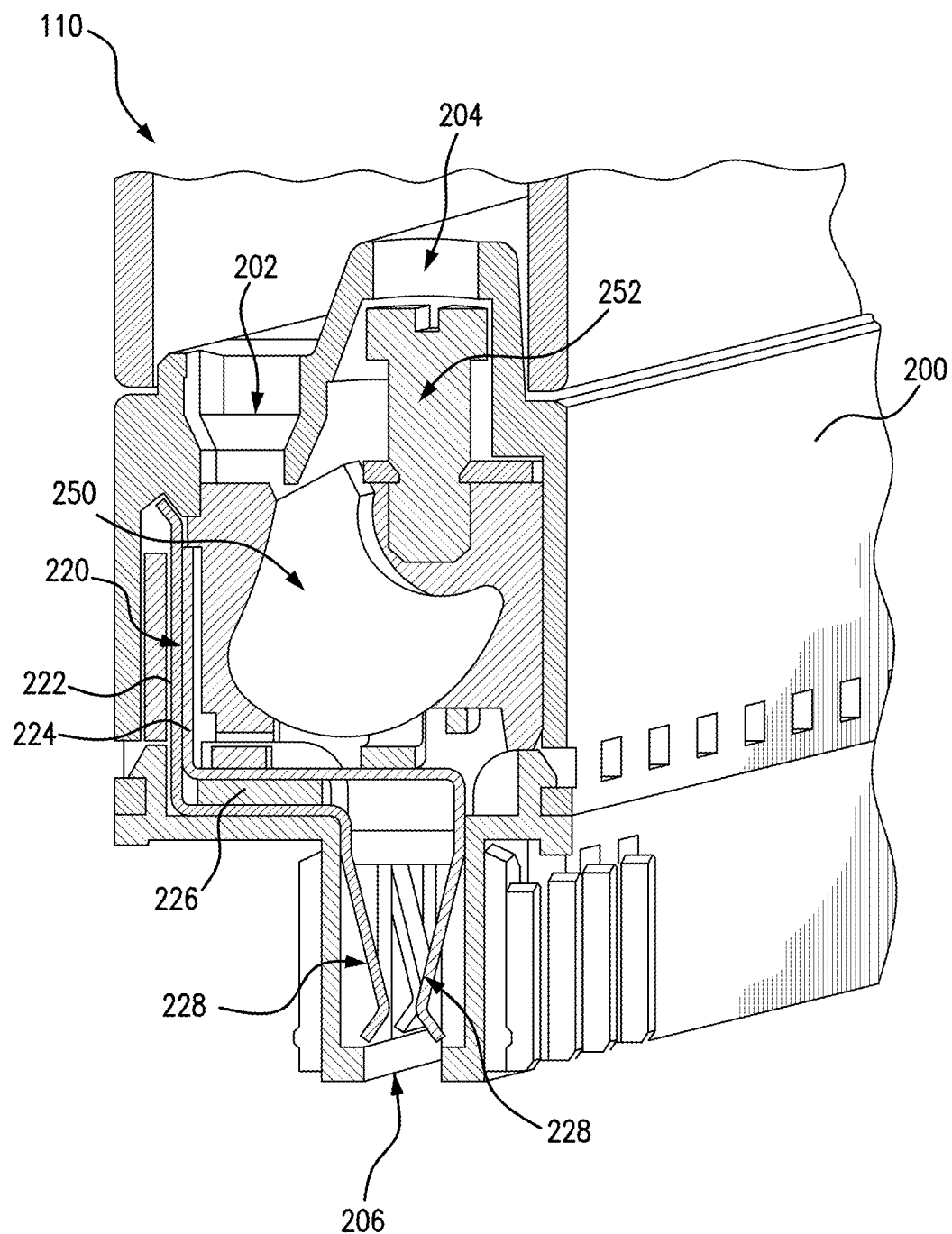
FIG. 2 illustrates a cross-sectional view of an example terminal block of an input module of FIG. 1 and its components including an electrical connector assembly incorporating an internal thermocouple, in accordance with an example.
Figure 3:
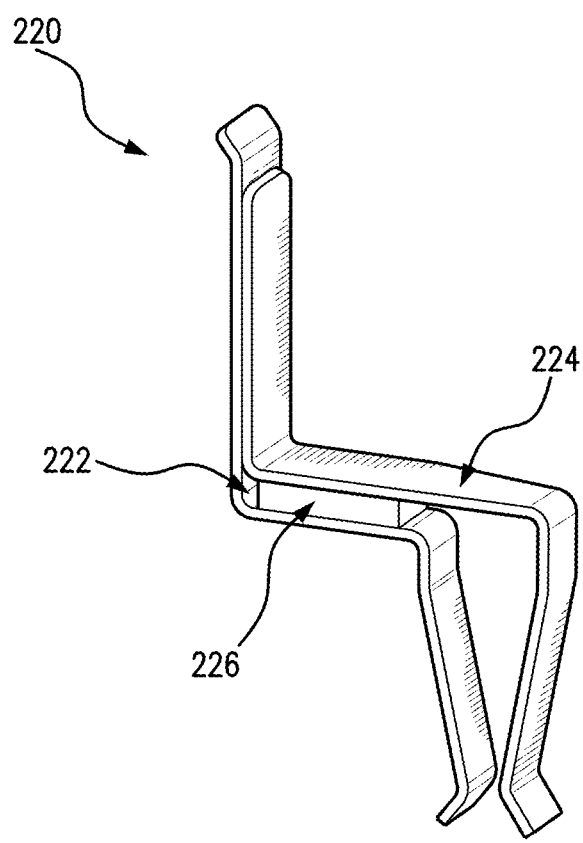
FIG. 3 illustrates a perspective view of the internal thermocouple of the terminal block of FIG. 2, in accordance with an example.

FIG. 2 illustrates example components of terminal block 110 of the input module 100, which can be configured to receive wire pairs of one or more external thermocouples, in accordance with an example. As shown, the terminal block 110 can include a housing (or enclosure) 200 which is partitioned into a plurality of terminals (or sub-terminal blocks) each of which can receive and terminate a field wiring. Each terminal includes an electrical connector assembly, arranged in a partition of the housing 200, for electrically coupling and decoupling the field wiring from a removable PCB 150 or corresponding electrical contact(s) thereon. The electrical connector assembly can include an internal thermocouple 220 having a first leg (or conductor) 222 formed of a first conductive material and a second leg (or conductor) 224 formed of a second conductive material different than the first conduct material. The first and second legs 222 and 224 are connected on one end to form a hot junction and separated on another end to form a jaw connector 228 for physically and electrically connecting or disconnecting an edge of the printed circuit board to or from the terminal block respectively. The hot junction of the internal thermocouple 220 is located in, at or around the wire termination region, where the field wiring terminates and connects to the internal thermocouple 220. An insulator 226 is arranged between the first and second legs 222 and 224 along a lengthwise portion thereof, such as for example between the hot junction and the jaw connector 228. The jaw connector 228 of the internal thermocouple 220 is arranged in a slot 206 (of the housing 200) for receiving an edge portion of a PCB with electrical contact(s). An enlarged perspective view of the internal thermocouple 220 and its components is shown in FIG. 3.

As further shown in FIG. 2, each terminal also can include an opening 202 for receiving a field wiring and a mechanical fastener for securing the field wiring to the internal thermocouple 220 (e.g., the hot junction of the internal thermocouple 220). In this example, the mechanical fastener is a screw fastener, which includes a pivot member 250 and a screw 252. The screw 252 is operable, via an opening 204 in the housing 200, in one direction (e.g., clockwise or counter-clockwise) to move the pivot member 250 to secure the field wiring against a portion of the internal thermocouple 220 or in an opposite direction to move the pivot member 250 to release the field wiring from the internal thermocouple 220.

Figure 4:
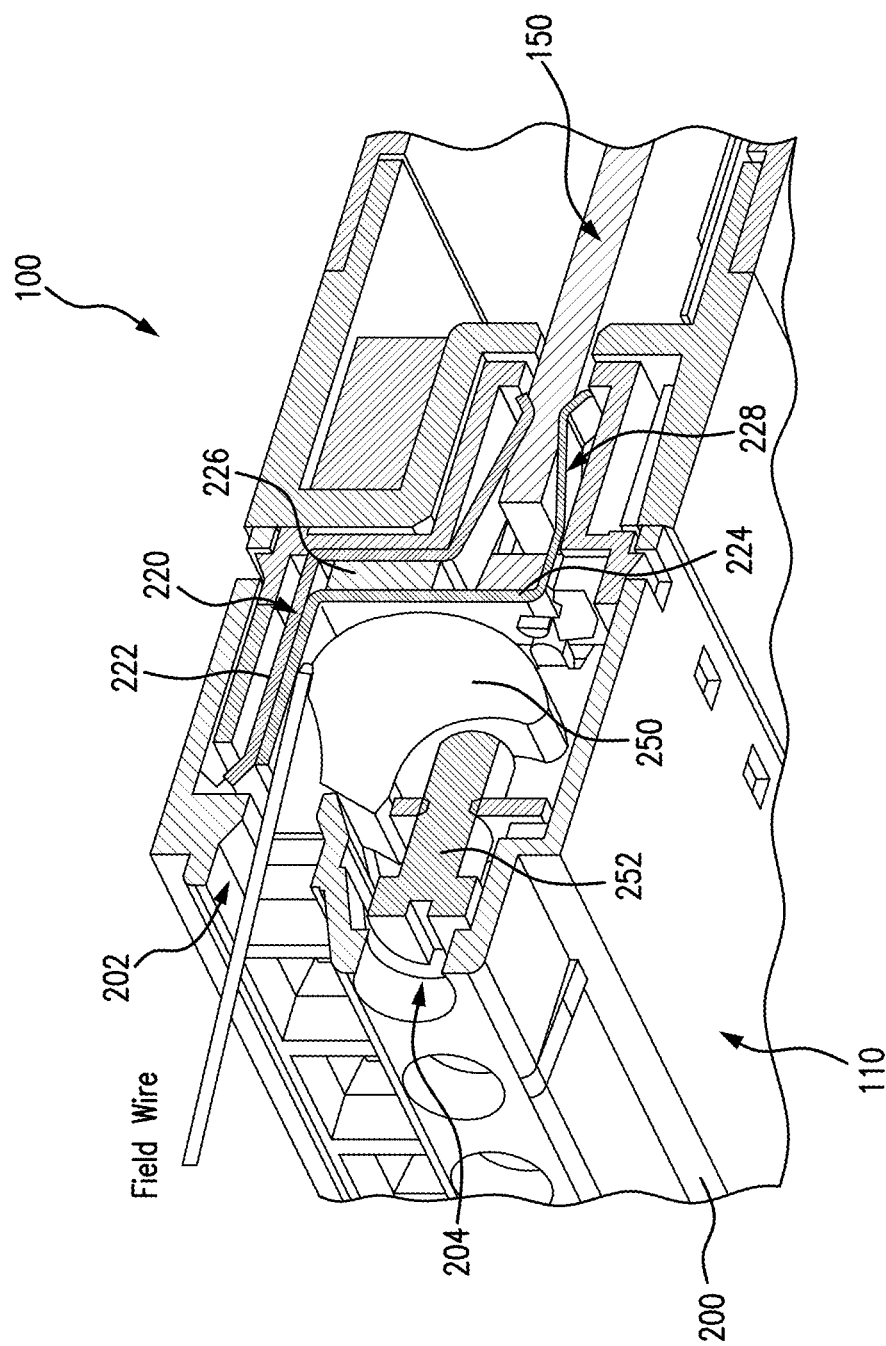
FIG. 4 illustrates a cross-sectional view of an example terminal block of an input module of FIG. 1, in accordance with an example.

FIG. 4 illustrates another cross-sectional view of the terminal block 110 of the input module 100 in which the removable PCB 150 (and the PCB housing) is connected to the terminal block 110, in accordance with a further example. As shown in FIG. 4, a field wire, such as from an external thermocouple 10, can be inserted into a terminal cavity of the terminal block 110 via the opening 202. Thereafter, the screw 252 can be rotated in one direction to move the pivot member 250 until the wire termination of the field wire is pressed against the hot junction end of the internal thermocouple 220 and secured thereto. The internal thermocouple 220 of the electrical connector assembly for the terminal serves as an electrical contact for electrically coupling the field wire to the PCB 150 or electrical contacts thereof. In this example, each leg 222 and 224 is connected to a different electrical contact on the isothermal edge region of the PCB 150, when the jaw connector 228 of the internal thermocouple 220 is connected to the PCB 150 as shown. In this way, a differential voltage between the two legs 222 and 224 can be sensed, detected, monitored, measured, calculated, derived or determined for use in performing the various methods described herein including cold junction compensation.

While FIG. 4 shows connection of one field wire to one terminal of the input module 100 and components thereof, the input module 100 can include a plurality of adjacent terminal pairs for receiving the wire pair of a plurality of external thermocouples (e.g., 10). Each terminal of the input module 100 on the terminal block 110 can be separated by an insulated or insulator wall.

Figure 5:
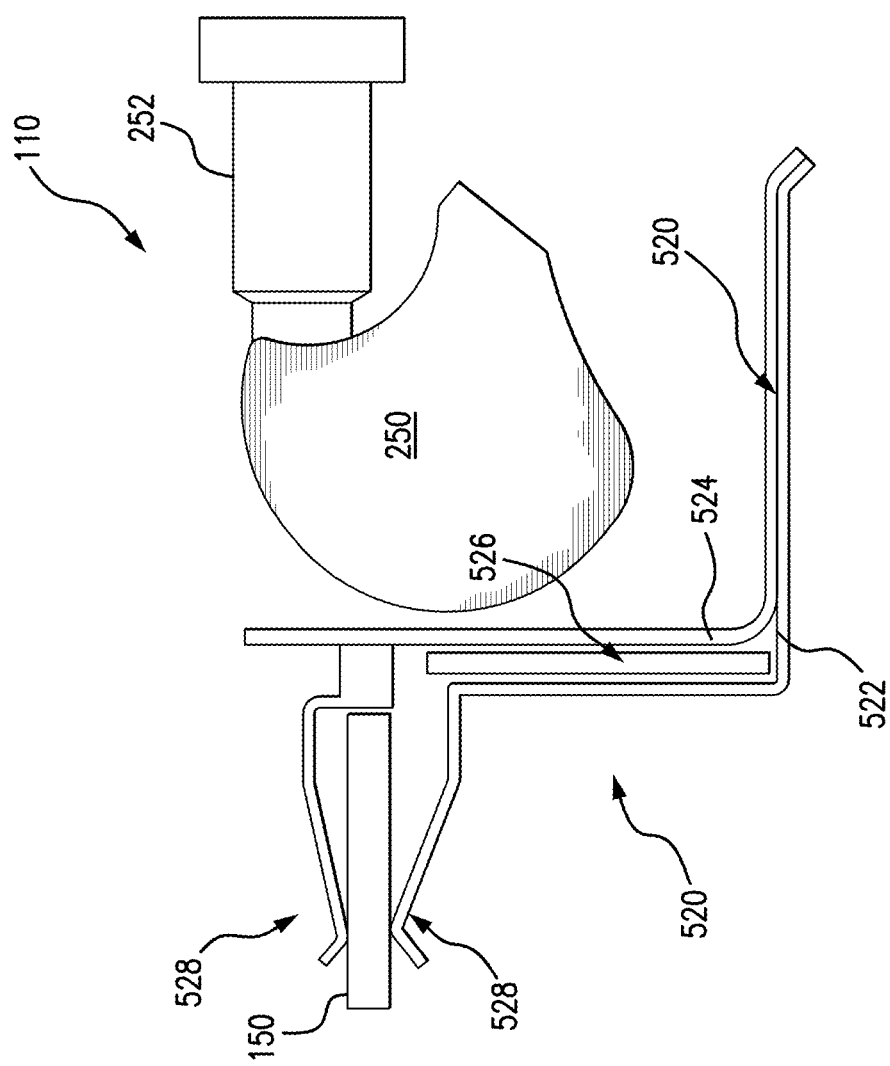
FIG. 5 illustrates a cross-sectional view of an example terminal block and the removable PCB of an input module of FIGS. 1 and 2, in accordance with a further example.

FIG. 5 illustrates a cross-sectional view of another example of an internal thermocouple 520, which can be used in a terminal block 110 of an input module 100, in accordance with a further example. As shown, the internal thermocouple 520 includes two electrically conductive legs 522 and 524, which are connected together at one end (or portion thereof) at a hot junction and separated at another end to form a jaw connector 528 for connecting to and disconnecting from a PCB and its electrical contacts. An insulator 526 is arranged between the legs 522 and 524 along a lengthwise portion of the internal thermocouple 520, such as for example between the hot junction and the jaw connector 528. As discussed herein, the two legs 522 and 524 are made of different electrically conductive materials, such as for example different conductive metals or metal alloys.

Various examples of an internal thermocouple (e.g., 120, 220 and 520) are shown and described herein. It should, however, be understood that the internal thermocouple and its different legs (or conductors) may be designed with different size, shape, dimension and materials according to the desired application.

Figure 6:
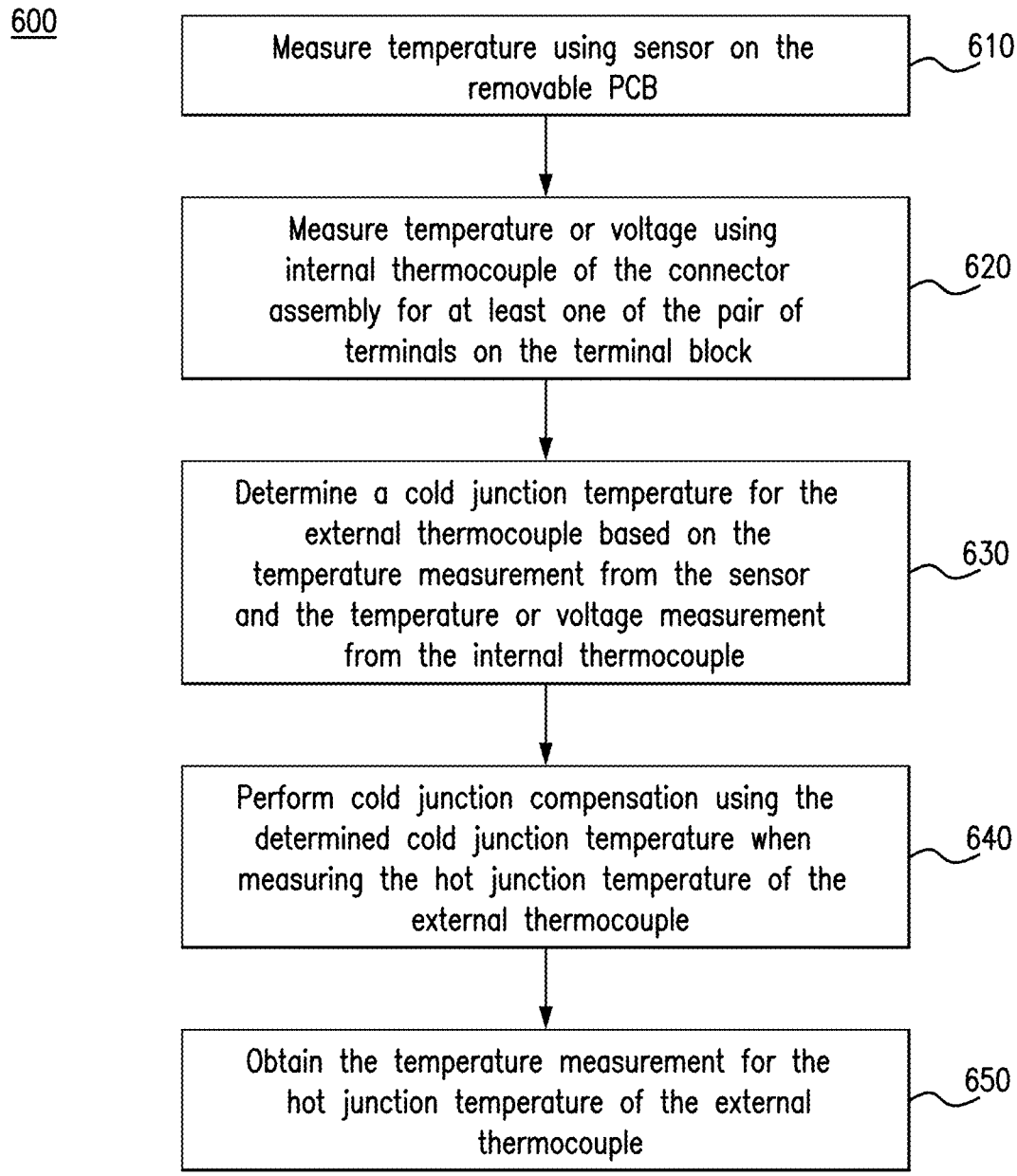
FIG. 6 is a flow chart illustrating example operations of performing cold junction compensation implemented by the input module of FIG. 1, in accordance with an example.

FIG. 6 is a flow chart illustrating example operations of a method 600 for performing cold junction compensation implemented by an input module or component(s) thereof, in accordance with an example. For the purposes of explanation, the method 500 will be described with reference to the example input module 100 and its components of FIG. 1.

The method 600 begins at block 610 in which a temperature of a region of the PCB 150 is measured using a sensor 162 on the removable PCB 150. The region can be an isothermal region along an edge of the PCB, which is connected to the terminal block 110 and its components.

At block 620, a temperature or voltage is measured using the internal thermocouple 120 of the connector assembly for at least one of the pair of terminals on the terminal block 110. In this example, the different wires 10A and 10B of an external thermocouple 10 are connected to corresponding terminals (e.g., positive and negative terminals) on the terminal block 110. In some examples, the temperature or voltage can be measured using the internal thermocouple 120 of each of the pair of terminals, and an average of the measurement can be used.

At block 630, a cold junction temperature of the external thermocouple 10 is determined via the processing circuit 160 based on the temperature measurement from the sensor 162 and the temperature or voltage measurement from at least one of the internal thermocouple 120. For example, the cold junction region of the external thermocouple 10 is the wire termination region in the terminal block 110. In one example, the cold junction temperature can be determined by adjusting the temperature measurement from the sensor 162 by a differential temperature measurement from at least one of the internal thermocouple 120. The differential temperature measurement is the difference in temperature between the hot junction of the internal thermocouple (e.g., at the wire termination region of the terminal block) and the cold junction of the internal thermocouple (e.g., at the isothermal edge region where the thermocouple is connected to the PCB 150). In this way, the temperature from the sensor 162 can be adjusted to accurately reflect the temperature at the wire termination region of the terminal block 110, or in other words, the cold junction temperature of the external thermocouple 10.

In an alternative example, the cold junction temperature for the external thermocouple 10 can be determined based on the temperature from the sensor 162 (e.g., the cold junction temperature of the internal thermocouple 120) and the detected voltage differential on the internal thermocouple 120.

At block 640, cold junction compensation is performed via the processing circuit 160 using the determined cold junction temperature when measuring the hot junction temperature of the external thermocouple 10. When measuring the voltage difference between the positive and negative terminals of the external thermocouple 10, one of the two legs 122 and 124 of the internal thermocouple 120 can be used (e.g., the leg positive leg, the leg made of Copper, etc.).

At block 650, the temperature measurement for the hot junction temperature of the external thermocouple is obtained, and can be provided to a controller (e.g., programmable logic controller (PLC)) which monitors and controls an operation of a process or system (and its components) such as an industrial process or system. The temperature measurement can be transmitted using wireline or wireless communication, via a communication device (or interface) on the PCB 150, to the controller.

It should be understood that temperature measurements related to a hot or cold junction of a thermocouple (e.g., the external thermocouple 10, the internal thermocouple(s) 120, etc.), as described herein, can be determined according to the Thermocouple/Seebeck coefficients, Thermocouple/Seebeck coefficient equations (or formulas) or Thermocouple/Seebeck coefficient reference tables or data related thereto for the materials of the thermocouple.

Various tests were performed using a standard input module, and the improved input module with the internal thermocouple(s) as described herein. The test results are shown in the FIGS. 7, 8 and 9 described below.

FIG. 7 is a graph 700 of temperature over time, which shows an example comparison of an average temperature 710 of a terminal block of an input module, an uncompensated temperature 720 measurement of the terminal block taken using a sensor on a PCB of an input module, and a compensated temperature measurement 730 taken using a sensor on a PCB (of an input module) which is compensated using information from an internal thermocouple of the terminal block, in accordance with an example. As shown, the input module with the internal thermocouple of the present disclosure can provide an accurate temperature measurement of the cold junction region (e.g., wire termination region of the terminal block) for use in cold junction compensation when measuring the hot junction temperature for an external thermocouple. The accuracy of the temperature measurements is not significantly affected by environmental conditions at the input module or components thereof (e.g., airflow, etc.). The data also reflects that the temperature measurements are accurate from the point of power ON, in comparison to standard configurations which may require one or more hours of warm up time.

FIG. 8 illustrates example graph 800 showing a summary of the data in the graph 700 in FIG. 7, namely a comparison of temperature measurement error 810 over time for an uncompensated temperature measurement and a compensated temperature measurement 820 using an internal thermocouple of the input module, in accordance with an example. As shown, the input module with the internal thermocouple of the present disclosure can provide temperature measurement of the cold junction region (e.g., wire termination region of the terminal block) with significantly less error or significantly more accuracy than standard input modules. The accuracy of the temperature measurements is not significantly affected by environmental conditions at the input module or components thereof (e.g., airflow, etc.) of the present disclosure. The data also reflects that the temperature measurements are accurate from the point of power ON, in comparison to standard configurations which may require one or more hours of warm up time.

FIG. 9 is an example graph 900 of temperature over time for a K-type input module, which show comparison of an average temperature 910 of a terminal block of an input module, an uncompensated temperature measurement 920 of the terminal block of an input module taken using a sensor on a PCB, and a compensated temperature measurement 930 of the terminal block of an input module taken using a sensor on a PCB which is compensated using information from an internal thermocouple connector(s) of the terminal block, in accordance with an example. As shown, the input module with the internal thermocouple of the present disclosure can provide an accurate temperature measurement of the cold junction region (e.g., wire termination region of the terminal block) for use in cold junction compensation when measuring the hot junction temperature for external thermocouple. The accuracy of the temperature measurements is not significantly affected by environmental conditions at the input module or components thereof (e.g., airflow, etc.). The data also reflects that the temperature measurements are accurate from the point of power ON, in comparison to standard configurations which may require one or more hours of warm up time.

FIG. 10 illustrates example graph 1000 showing a summary of the data in the graph 900 in FIG. 9, namely a comparison of temperature measurement error 1010 over time for an uncompensated temperature measurement and a compensated temperature measurement 1020 using an internal thermocouple of the input module, in accordance with an example. As shown in this example, the input module with the internal thermocouple of the present disclosure can provide temperature measurement of the cold junction region (e.g., wire termination region of the terminal block) with significantly less error or significantly more accuracy than standard input modules. The accuracy of the temperature measurements is not significantly affected by environmental conditions at the input module or components thereof (e.g., airflow, etc.) of the present disclosure. The data also reflects that the temperature measurements are accurate from the point of power ON, in comparison to standard configurations which may require one or more hours of warm up time.

In the preceding, reference is made to various examples. However, the scope of the present disclosure is not limited to the specific described examples. Instead, any combination of the described features and elements, whether related to different examples or not, is contemplated to implement and practice contemplated examples. Furthermore, although examples may achieve advantages over other possible solutions or over the prior art, whether or not a particular advantage is achieved by a given example is not limiting of the scope of the present disclosure. Thus, the preceding aspects, features, examples and advantages are merely illustrative and are not considered elements or limitations of the appended claims except where explicitly recited in a claim(s).

It should also be understood that the examples disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

The various examples disclosed herein may be implemented as a system, method or computer program product. Accordingly, aspects may take the form of an entirely hardware example, an entirely software example (including firmware, resident software, micro-code, etc.) or an example combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various examples of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An input module comprising:
a terminal block defining a plurality of terminals, each terminal of the plurality of terminals including an opening to receive an external wire;
an electrical connector assembly received by at least one terminal of the plurality of terminals of the terminal block, the electrical connector assembly including an internal thermocouple and a pivot member, the internal thermocouple having a first leg and a second leg, the first leg and the second leg being coupled together at a first end of the internal thermocouple and spaced apart to define a jaw connector at a second end of the internal thermocouple, and the pivot member being pivotable relative to the terminal block to couple the external wire to the first end; and
a printed circuit board configured to be coupled to the electrical connector assembly via the jaw connector, the printed circuit board including a processing circuit configured to perform cold junction compensation for a temperature associated with the external wire based on a temperature of the printed circuit board and a temperature or a voltage of the internal thermocouple.

2. The input module of claim 1, wherein the internal thermocouple includes an insulator arranged between the first leg and the second leg, and the insulator is positioned between the first end and the jaw connector.

3. The input module of claim 1, wherein the pivot member is pivotable adjacent to the second leg.

4. The input module of claim 1, wherein the first leg is formed of a first material, the second leg is formed of a second material, and the first material and the second material are different.

5. The input module of claim 1, further comprising a sensor coupled to the printed circuit board that is configured to measure the temperature of the printed circuit board.

6. The input module of claim 1, wherein the processing circuit is configured to determine a cold junction temperature for the external wire based on the temperature of the printed circuit board and the temperature or the voltage of the internal thermocouple, and to perform the cold junction compensation based on the cold junction temperature.

7. The input module of claim 1, wherein the external wire is an electrical wire associated with an external thermocouple.

8. The input module of claim 1, wherein the terminal block includes a housing that defines the plurality of terminals and a slot, and the jaw connector is positioned within the slot.

9. The input module of claim 8, wherein an edge of the printed circuit board is received within the slot.

10. The input module of claim 8, wherein for each terminal of the plurality of terminals, the housing defines a fastener opening spaced apart from the opening, the fastener opening configured to receive a fastener and the fastener is movable relative to the housing to pivot the pivot member.

11. The input module of claim 10, wherein the pivot member has a first contact surface spaced apart from a second contact surface, and the first contact surface is configured to contact the fastener and the second contact surface is configured to contact the external wire.

12. An input module comprising:
a terminal block including a housing defining a plurality of terminals and at least one opening associated with each terminal of the plurality of terminals, the at least one opening being configured to receive an external wire of an external thermocouple;
an electrical connector assembly received by at least one terminal of the plurality of terminals of the terminal block, the electrical connector assembly including an internal thermocouple and a pivot member, the internal thermocouple having a first leg and a second leg formed of different materials, the first leg and the second leg being coupled together at a first end of the internal thermocouple and spaced apart to define a jaw connector at a second end of the internal thermocouple, and the pivot member being pivotable relative to the housing to couple the external wire to the first end; and
a printed circuit board coupled to the electrical connector assembly via the jaw connector, the printed circuit board including a processing circuit configured to perform cold junction compensation for a temperature associated with the external wire based on a temperature of the printed circuit board and a temperature or a voltage of the internal thermocouple.

13. The input module of claim 12, wherein the internal thermocouple includes an insulator arranged between the first leg and the second leg, and the insulator is positioned between the first end and the jaw connector.

14. The input module of claim 12, wherein the pivot member is pivotable adjacent to the second leg.

15. The input module of claim 12, further comprising a sensor coupled to the printed circuit board that measures the temperature of the printed circuit board, the processing circuit being configured to determine a cold junction temperature for the external wire based on the temperature of the printed circuit board and the temperature or the voltage of the internal thermocouple, and to perform the cold junction compensation based on the cold junction temperature.

16. The input module of claim 12, wherein the housing defines a slot, and the jaw connector is positioned within the slot.

17. The input module of claim 16, wherein an edge of the printed circuit board is received within the slot.

18. The input module of claim 12, wherein the at least one opening associated with each terminal of the plurality of terminals includes a fastener opening configured to receive a fastener and an opening configured to receive the external wire.

19. The input module of claim 18, wherein the fastener is movable relative to the housing to pivot the pivot member.

20. The input module of claim 18, wherein the pivot member has a first contact surface spaced apart from a second contact surface, the first contact surface is configured to contact the fastener, and the second contact surface is configured to contact the external wire.

\* \* \* \* \*